Dec. 15, 1925.
P. LA DELFA
1,566,261
EMERGENCY WHEEL SUPPORTING DEVICE
Filed Nov. 7, 1924
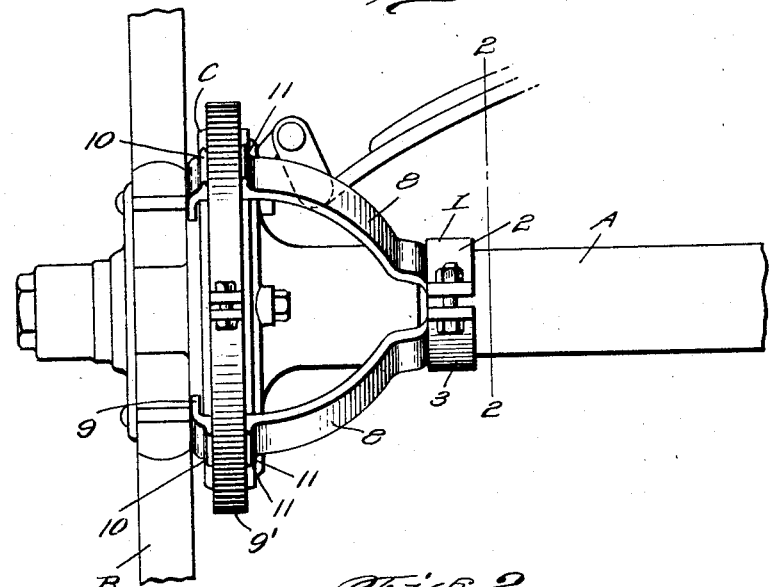
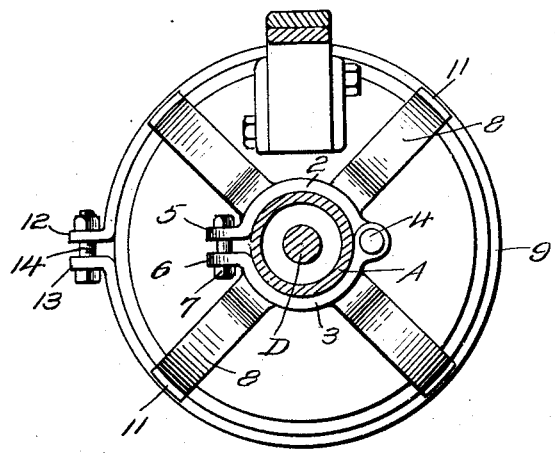
Inventor
Philip LaDelfa.
By Clarence A. O'Brien
Attorney Patented Dec. 15, 1925.

1,566,261

UNITED STATES PATENT OFFICE.

PHILIP LA DELFA, OF CUYLERVILLE, NEW YORK.

EMERGENCY-WHEEL-SUPPORTING DEVICE.

Application filed November 7, 1924. Serial No. 748,420.

*To all whom it may concern:*

Be it known that I, PHILIP LA DELFA, a citizen of the United States, residing at Cuylerville, in the county of Livingston and State of New York, have invented certain new and useful Improvements in Emergency-Wheel-Supporting Devices, of which the following is a specification.

This invention relates to a highly novel means for supporting a vehicle drive wheel against lateral displacement from the rear axle housing of a motor vehicle, when the rear axle has accidentally been broken.

A further object of the invention is to provide a device of the above mentioned character which may be readily and easily secured in position, the parts being so arranged as to permit the drive wheel, with which the same is associated, to rotate, so that the vehicle may be transported.

A further object of the invention is to provide a device of the above mentioned character, which is simple in construction, inexpensive, strong and durable and further well adapted for the purposes for which it is designated.

Other objects and advantages of this invention will become apparent during the course of the following description.

In the accompanying drawing, forming a part of this specification, and in which like numerals designate like parts throughout the same:

Figure 1 is a side elevation of the device embodying my invention, showing the same applied, and Figure 2 is a sectional view, taken approximately on the line 2—2 of Figure 1.

In the drawing, wherein for the purpose of illustration is shown the preferred embodiment of my invention, the numeral 1 designates a band, which is adapted to encircle the rear axle housing A, of a motor vehicle, preferably of the Ford type, adjacent the usual brake mechanism. The band includes the complementary sections 2 and 3, which are hingedly connected together at 4, the free ends of the complementary sections terminating in laterally extending flanges 5 and 6 respectively, through which extends the fastening means 7, as more clearly illustrated in Figure 2.

Extending axially from the outer side edge of the band 1 are the outwardly curved arms 8, the same being arranged in spaced relation with respect to each other, and further in such a manner as not to interfere with the actuation of the usual brake mechanism. The outer ends of the arms are disposed inwardly to provide the fingers 9, the same being adapted to be disposed between the vehicle drive wheel B and the hub brake drum C carried thereby, and spaced therefrom, in the manner well known in the art.

The device is adapted to be used when the rear axle D becomes broken and the purpose of the device is to provide a means for preventing the vehicle drive wheel carried by the broken axle from accidentally becoming disengaged from the axle housing. The band 1 is placed around the axle housing A, and the fingers 9 formed on the outer end of the curved arms 8 are disposed between the wheel B and the hub brake drum C, so that the wheel B will not move laterally with respect to the axle housing, yet be permitted to rotate when the vehicle is towed. For the purpose of preventing a displacement of the fingers 9, from their proper positions, when the device is applied, I provide a locking band 9', which is adapted to extend around the arms 8, adjacent the fingers 9, to prevent the lateral displacement of the locking band 9' from the arms 8, each of the arms is provided with a pair of spaced upstanding lugs 10 and 11, between which is received the locking band 9'. The free ends of the locking band 9' terminate in the laterally extending flanges 12 and 13, and any suitable fastening means, such as illustrated at 14 is adapted to co-operate with the flanges 12 and 13, in the manner more clearly illustrated in Figure 2. The band 9' will prevent any outward movement of the arms 8 with respect to the brake mechanism over which the arms are disposed, so as to insure the proper functioning of the device.

The provision of a device of the above mentioned character will enable a motor vehicle whose rear axle has been broken to be easily towed, without any danger of the drive wheel associated with the broken axle moving laterally with respect to the axle housing. A device of the above mentioned character is especially adapted to be used in conjunction with automobiles of the Ford type.

While I have shown the preferred embodiment of my invention, it is to be understood that various changes in the size, shape, and arrangement of parts may be resorted to, without departing from the spirit of the invention and the scope of the appended claim.

Having thus described my invention, what I claim is:

Means for preventing the lateral displacement of the drive wheel of a vehicle with respect to the axle housing comprising a band adapted to encircle the axle housing, arms extending laterally and diverging outwardly from said band, the outer ends of the arms terminating in inwardly extending fingers, said fingers being adapted to be disposed between the drive wheel and the brake drum associated therewith to permit the drive wheel to rotate, a pair of spaced lugs extending outwardly from each arm adjacent its finger, and a locking band encircling said arms and disposed between the lugs on each arm for preventing the outward movement of the fingers with respect to the wheel and the brake drum.

In testimony whereof I affix my signature.

PHILIP LA DELFA.